(12) United States Patent
Sehier et al.

(10) Patent No.: US 11,968,006 B2
(45) Date of Patent: Apr. 23, 2024

(54) PHYSICAL LAYER SECURITY BY PSEUDO-RANDOM LAYER MAPPING

(71) Applicant: Nokia Technologies Oy, Espoo (FI)

(72) Inventors: Philippe Sehier, Saint Germain en Laye (FR); Keeth Saliya Jayasinghe Laddu, Espoo (FI); Luca Rose, Orsay (FR); Fanny Jardel, La Norville (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 144 days.

(21) Appl. No.: 17/763,753

(22) PCT Filed: Sep. 30, 2019

(86) PCT No.: PCT/IB2019/058307
§ 371 (c)(1),
(2) Date: Mar. 25, 2022

(87) PCT Pub. No.: WO2021/064444
PCT Pub. Date: Apr. 8, 2021

(65) Prior Publication Data
US 2023/0033736 A1    Feb. 2, 2023

(51) Int. Cl.
*H04B 7/0456* (2017.01)
*H04L 9/08* (2006.01)
*H04W 12/03* (2021.01)
*H04W 12/041* (2021.01)

(52) U.S. Cl.
CPC ......... *H04B 7/0473* (2013.01); *H04L 9/0869* (2013.01); *H04W 12/03* (2021.01); *H04W 12/041* (2021.01); *H04L 2209/80* (2013.01)

(58) Field of Classification Search
CPC .. H04B 7/0473; H04W 12/041; H04W 12/03; H04W 12/043; H04W 12/0431; H04W 12/0433; H04W 12/037; H04W 12/033; H04L 9/0869
See application file for complete search history.

(56) References Cited

U.S. PATENT DOCUMENTS

| | | | |
|---|---|---|---|
| 2003/0018608 A1* | 1/2003 | Rice | G06F 21/14 |
| 2012/0213181 A1 | 8/2012 | Walton et al. | 370/329 |
| 2014/0040338 A1* | 2/2014 | Van Der Sluis | H04L 9/0866 708/254 |
| 2018/0167237 A1 | 6/2018 | Gudovskiy et al. | |
| 2020/0351817 A1* | 11/2020 | Lee | H04W 68/005 |
| 2022/0085984 A1* | 3/2022 | Khandani | H04L 9/0822 |

FOREIGN PATENT DOCUMENTS

WO    WO 2018/128780 A1    7/2018

* cited by examiner

*Primary Examiner* — Khanh C Tran
(74) *Attorney, Agent, or Firm* — Robert P. Michal, Esq.; Carter, DeLuca & Farrell LLP

(57) ABSTRACT

Systems, methods, apparatuses, and computer program products for physical layer security by pseudo-random layer mapping.

20 Claims, 7 Drawing Sheets

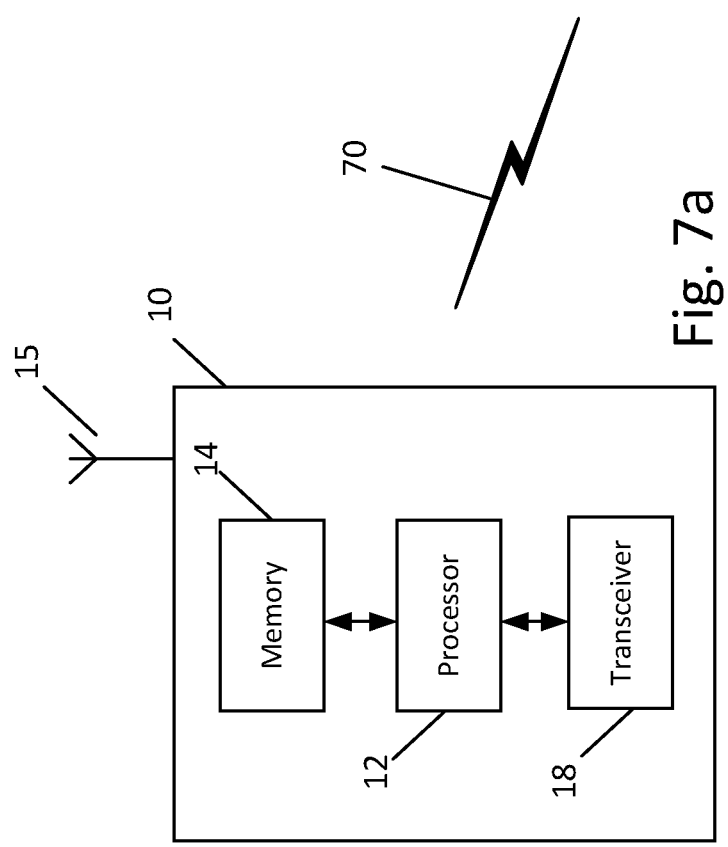
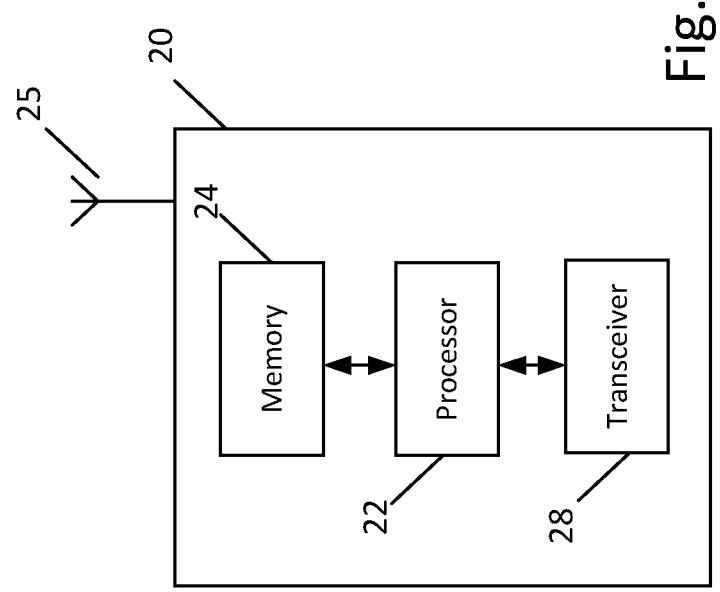

PHYSICAL LAYER SECURITY BY PSEUDO-RANDOM LAYER MAPPING

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for physical layer security by pseudo-random layer mapping.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also build on E-UTRA radio. It is estimated that NR may provide bitrates on the order of 10-20 Gbit/s or higher, and may support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

SUMMARY

According to a first embodiment, a method may include generating, by a network node, at least one random object based on an encryption key. The encryption key may be used as a seed for a random object generator. According to the first embodiment, the method may include performing, by the network node, a linear transform of transmit symbols into one or more spatial layers based on the at least one random object generated from the encryption key. The linear transform may be performed between a modulation layer of a physical layer of the network node and a mapping layer of the physical layer of the network node.

In a variant, the encryption key may be based on one or more physical parameters. In a variant, the at least one random object may be a permutation matrix or a random sequence. In a variant, the linear transform may be a permutation on a vector. In a variant, multiple non-collocated transmit receive points (TRPs) may correspond to multiple spatial layers when the one or more spatial layers include more than one spatial layer. In a variant, the multiple transmit receive points (TRPs) may serve the same cell.

In a variant, the method may include providing modulated symbol vectors to the mapping layer of the network node. In a variant, a size of the modulated symbol vectors may depend on a quantity of the one or more spatial layers and a quantity of symbols per spatial layer. In a variant, the one or more spatial layers may include multiple spatial layers. In a variant, the multiple spatial layers may be associated with a single transmit receive point (TRP) or may be associated with multiple transmit receive points (TRPs). In a variant, a quantity of the one or more spatial layers may be specific to a user equipment (UE).

In a variant, the encryption key may be combined with other information to form the seed. In a variant, the method may include generating at least one separate random object for each symbol vector to be transformed. In a variant, the at least one separate random object may be a pointer in a lookup table. In a variant, the lookup table may include one or more transformation matrices arranged by layer numbers. In a variant, the method may include multiplying each symbol vector by a transformation matrix of the one or more transformation matrices. In a variant, the one or more transformation matrices may have a full rank with a matching eigenvalue.

According to a second embodiment, a method may include receiving, by a user equipment (UE), one or more spatial layers. Transmit symbols on the one or more spatial layers may be mapped to the one or more spatial layers based on at least one random object generated from an encryption key. According to the second embodiment, the method may include performing, by the UE, an inverse linear transform of soft samples of the one or more spatial layers based on the encryption key and a manner in which a linear transform was performed. The inverse linear transform may be performed between a de-mapping layer and a demodulation layer of a physical layer stack of the UE.

In a variant, the encryption key may be based on one or more physical parameters. In a variant, the at least one random object may be a permutation matrix or a random sequence. In a variant, the inverse linear transform may be an inverse permutation on a vector. In a variant, multiple non-collocated transmit receive points (TRPs) may correspond to multiple spatial layers when the one or more spatial layers include more than one spatial layer. In a variant, the multiple transmit receive points (TRPs) may serve the same cell. In a variant, the method may include performing the inverse linear transform after multiple input, multiple output (MIMO) processing. In a variant, the one or more spatial layers may include multiple spatial layers.

In a variant, the multiple spatial layers may be associated with a single transmit receive point (TRP) or may be associated with multiple transmit receive points (TRPs). In a variant, a quantity of the one or more spatial layers may be specific to the UE.

In a variant, the method may include providing the soft samples to the de-modulating layer of the physical layer stack after performing the inverse linear transform. In a variant, the method may include performing the inverse linear transform using an inverse of a transformation matrix associated with mapping the transmit symbols to the one or more spatial layers.

A third embodiment may be directed to an apparatus including at least one processor and at least one memory comprising computer program code. The at least one memory and computer program code may be configured, with the at least one processor, to cause the apparatus at least to perform the method according to the first embodiment or the second embodiment, or any of the variants discussed above.

A fourth embodiment may be directed to an apparatus that may include circuitry configured to perform the method according to the first embodiment or the second embodiment, or any of the variants discussed above.

A fifth embodiment may be directed to an apparatus that may include means for performing the method according to the first embodiment or the second embodiment, or any of the variants discussed above.

A sixth embodiment may be directed to a computer readable medium comprising program instructions stored thereon for performing at least the method according to the first embodiment or the second embodiment, or any of the variants discussed above.

A seventh embodiment may be directed to a computer program product encoding instructions for performing at least the method according to the first embodiment or the second embodiment, or any of the variants discussed above.

BRIEF DESCRIPTION OF THE DRAWINGS

For proper understanding of example embodiments, reference should be made to the accompanying drawings, wherein:

FIG. 7a illustrates an example block diagram of an apparatus, according to an embodiment; and FIG. 7b illustrates an example block diagram of an apparatus, according to another embodiment.

DETAILED DESCRIPTION

Figure 1:
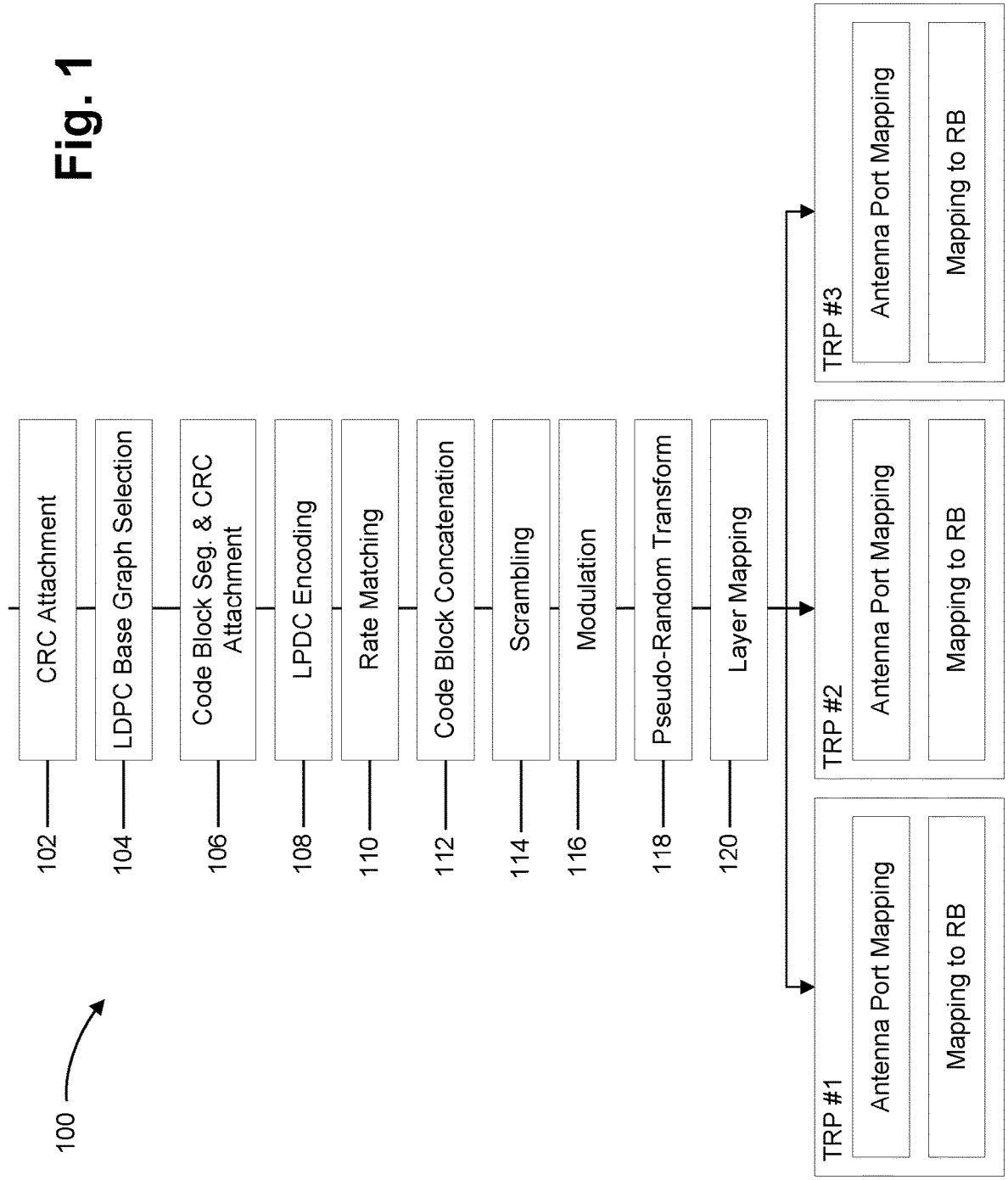
FIG. 1 illustrates an example physical layer stack, according to some embodiments described herein.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for controlling operations of a network node and/or a user equipment (UE), is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

The field of modern cryptography is typically divided into two groups: information-theoretic and complexity-based security. In the past, only complexity-based security was applied to communications. Information-theoretic security is a different paradigm that may be based on information insufficiency and may not depend on computational difficulty. In other words, this type of encryption cannot be broken even if an adversary has unlimited computing power because the adversary would not have enough information to break the encryption. Thus, the cryptosystems are considered crypt-analytically unbreakable.

Third Generation Partnership Project (3GPP) has not considered any specific requirements on physical layer security in the initial stages of New Radio (NR). Therefore, data security has been provided only by the higher processing layers (e.g., in packet data convergence protocol (PDCP) for 4G and 5G). Some existing features, like beamforming, provide some inherent security level due to spatial isolation properties, but this remains very limited in performance. In addition, some existing techniques create an encryption key from a transmission channel estimate. However, the security of transmissions may be improved by incorporating physical layer-related components and using them to encrypt the data transmissions. Improving security is a key objective in 5G, especially because of the massive deployment of Internet of Things (IoT) devices.

Some embodiments described herein may provide for a scheme that enables physical layer security (PLS) based on information theory to compliment and improve communication security of wireless networks. For example, some embodiments described herein may utilize the randomness of the transmission channel to create secret information between one or more transmit receive points (TRPs). In addition, some embodiments may relate to how to enforce cryptographic-secure communications by including an extra layer of security at the physical layer. For example, an encryption key may be created based on physically relevant parameters. Such a key may then be used to perform a linear transform of transmit symbols (in some embodiments, the linear transform may be a permutation) and the processed symbols may be mapped into different spatial layers.

FIG. 1 illustrates an example physical layer stack according to some embodiments described herein. FIG. 1 shows an example physical layer (or function) stack 100 of a network node, where a pseudo-random transformation is applied to a modulated vector prior to layer mapping. For example, the physical layer stack 100 may include various processing layers (or functions), such as a cyclic redundancy check (CRC) attachment layer 102, a low density parity check (LDPC) base graph selection layer 104, a code block segment ("Seg.") and CRC attachment layer 106, a LDPC encoding layer 108, a rate matching layer 110, a code block concatenation layer 112, a scrambling layer 114, a modulation layer 116, a pseudo-random transform layer 118, and a layer mapping layer 120. In addition, FIG. 1 further shows multiple TRPs (TRP #1 through TRP #3, for example) in communication with the physical layer stack 100. The configuration shown in FIG. 1 may apply to the downlink direction of a communication system in which a UE (not shown in FIG. 1) receives one or more spatial layers from the network node (e.g., from one or more of TRP #1 through TRP #3). The one or more spatial layers may originate from co-located or non-co-located TRPs (e.g., TRPs #1 through #3 may be co-located or non-co-located). In other words, one or more TRPs may be associated with a network node and the TRPs may be co-located or non-co-located with each other. The network node may perform various operations and may provide mapped transmit symbols to one or more associated TRPs for transmission to a UE, as described below.

The ingress data for the layer mapping layer 120 may include modulated symbol vectors with a size depending on a number of layers and/or a number of symbols per layer. For example, output from the pseudo-random transform layer 118 may include modulated symbol vectors that have be processed using a transform, such as a linear transform. Although some embodiments described herein are described as using a linear transform, certain embodiments may equally use a non-linear transform, a memory-based transform, or another type of transform that can be inverted and that does not degrade network node or UE performance. In some embodiments, the layer mapping layer 120 may form equal size subsets of this vector. The layer mapping layer 120 may then map each subset to a different spatial layer. The layers to which the subsets are mapped may include multiple layers on a single TRP or the total quantity of layers may be mapped across different TRPs. The number of layers may be specific to each UE, and may depend on a network node's decisions and/or a UE's recommendations (e.g., based on channel state information (CSI) transmitted to the network node by the UE).

In the case where multiple non-collocated TRPs are utilized with non-coherent joint transmission (NC-JT), each TRP may processes a specific set of layers. For example, and with respect to the configuration shown in FIG. 1, it may possible to have two layers processed by TRP #1, one layer by TRP #2, and zero layers by TRP #3 for a given UE, rather than each TRP processing one layer.

Some embodiments described herein are applicable when a UE is supported by multi-TRP transmissions in which several non-collocated TRPs are used. The configuration illustrated in FIG. 1 may correspond to a single physical downlink control channel (PDCCH)-based multi-TRP transmission in which the TRPs involved serve the same cell. This situation may maximize security performance (e.g., compared to conventional multiple input, multiple output (MIMO)), and may also provide advantages with regard to deployment of certain embodiments described herein. In embodiments described herein, it is assumed that the UE has several antennas, and can demodulate several layers simultaneously. In a configuration involving several non-collocated TRPs, an enhanced security level may be provided since an eavesdropper may have to be at the location of the intended receiver to detect all the signals required to correctly detect the message.

In this way, some embodiments described herein may inject unpredictability into the mapping process by using a permutation process (e.g., driven by an encryption key, as described elsewhere herein).

As described above, FIG. 1 is provided as an example. Embodiments are not limited to the example of FIG. 1.

Figure 2:
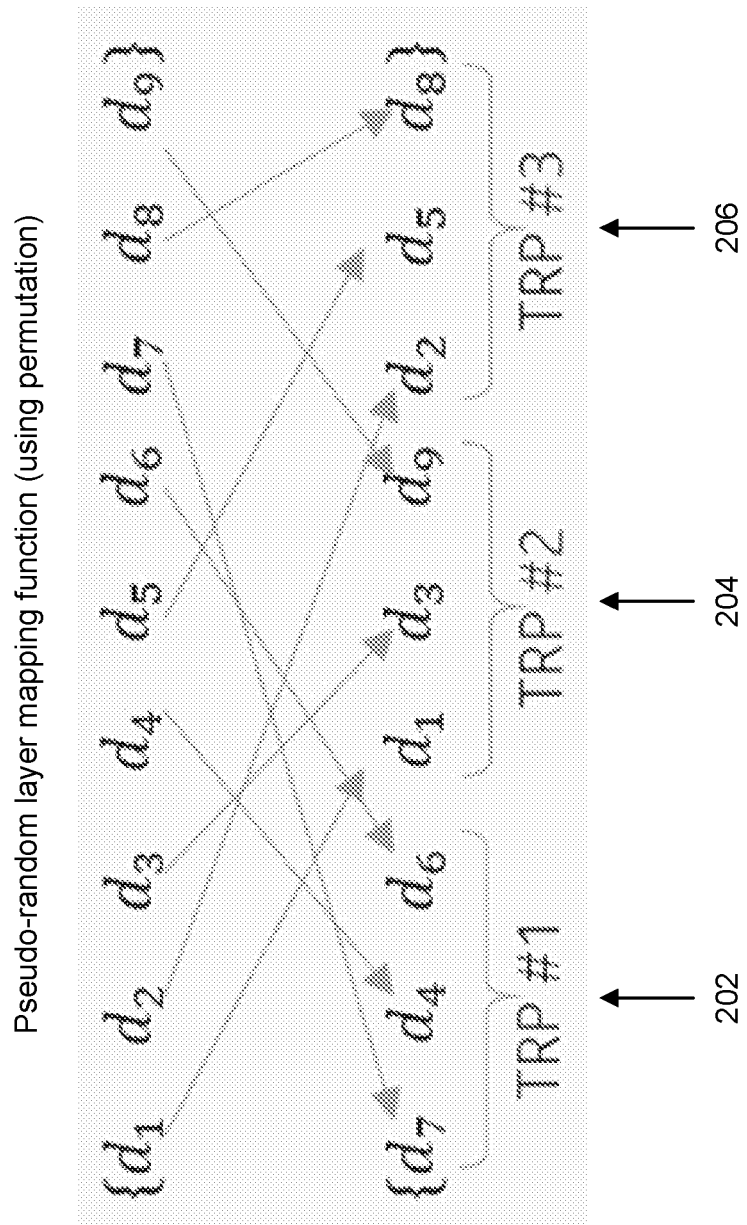
FIG. 2 illustrates an example permutation process, according to some embodiments described herein.

FIG. 2 illustrates an example permutation process according to some embodiments described herein. For example, FIG. 2 shows a pseudo-random layer mapping function using permutation (as an example of linear transform), according to some embodiments described herein. Specifically, FIG. 2 shows mapping of symbols ($d_1$, $d_2$ . . . $d_9$, for example) to different spatial layers corresponding to TRPs #1 through #3. For example, and as shown by reference number 202, symbols $d_7$, $d_4$, and $d_6$ may be mapped to TRP #1. As another example, and as shown by reference number 204, symbols $d_1$, $d_3$, and $d_9$ may be mapped to TRP #2. As another example, and as shown by reference number 206, symbols $d_2$, $d_5$, and $d_8$ may be mapped to TRP #3.

The default codeword-layer mapping used for determining the symbols transmitted in each spatial layer may use additional permutation functionality, where the permutation may be derived based on an encryption key. For example, the permutation functionality may include a permutation on a vector. By doing so, an eavesdropper may have no means to rebuild an original message since the eavesdropper would not have information regarding the transformation applied to the symbols. The use of permutation functionality is provided merely as an example of a more general framework. Certain embodiments described herein may equally use other transforms (or interleaving techniques).

As described above, FIG. 2 is provided as an example. Embodiments are not limited to the example of FIG. 2.

Figure 3:
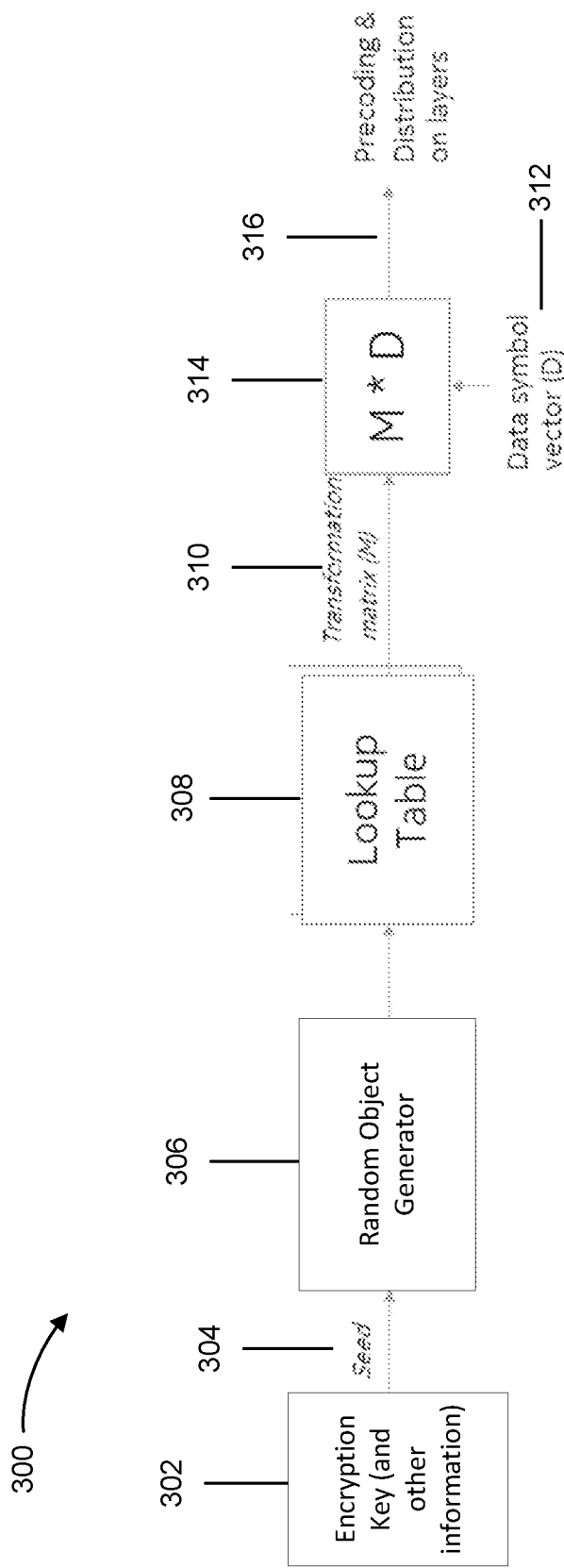
FIG. 3 illustrates an example pseudo-random transformation, according to some embodiments described herein.

FIG. 3 illustrates an example pseudo-random transformation according to some embodiments described herein. For example, FIG. 3 shows operations 300 that include multiplying each symbol vector to be mapped by a transformation matrix in order to determine the mapping of the symbols to one or more spatial layers.

As shown at 302, an encryption key, which may be combined with other information, such as a radio network temporary identifier (RNTI), a cell identifier (CID), and/or the like, is provided by the physical layer or another higher layer (e.g., to the pseudo-random transform layer 118 of FIG. 1). As shown at 304, the encryption key may be used as a random seed of a random object generator 304 (e.g., a random integer number generator). The random object generator 304 may generate a random object (or a pseudo-random object) from the encryption key (and the other information combined with the encryption key). For example, a random object may include a random permutation matrix (e.g., where values of the random permutation matrix are generated randomly), a random sequence (e.g., an integer sequence, a binary sequence, and/or the like), and/or the like. Although some embodiments are described as using a length-$2^{31}$ Gold sequence as an example random sequence (or pseudo-random sequence), other random sequences (Gold or non-Gold sequences) or sequences with difference lengths equally apply to certain embodiments described herein. Certain embodiments described herein may include a pseudo-random object generator, such as a Gold sequence generator that generates a length-$2^{31}$ sequence. For each symbol vector, the random object generator 304 may generate a random object (or pseudo-random object) that may be used as a pointer to a lookup table 308. For example, lookup table 308 may be populated with information that identifies various transformation matrices (M), and the random object generated may be used to identify a particular transformation matrix (M) in the lookup table 308. In some embodiments, the lookup table 308 may store transformation matrices by layer numbers (e.g., layer numbers 1 to 4).

A transformation matrix (M) may have a dimension N×N, where N is a size of a symbol vector. The transformation matrix (M) may have a full rank with a matching eigenvalue, such that inversion does not create noise amplification. The eigenvalues for transformation matrix (M) may be identical or may vary slightly, such that a ratio between the highest and smallest eigenvalues is close to 1, such as between 0.90 and 1.10.

As specific examples, the transformation matrix (M) may be a permutation matrix (e.g., with a single "1" per row of the matrix and "0" in all other positions of the matrix), a permutation matrix with phase rotation (e.g., a permutation matrix where each "1" value is replaced with a complex unitary number), or any type of full rank matrix. Using a permutation matrix may enable any symbol initially planned to be sent on a certain layer, to be sent on another layer (possibly from another TRP). Using a permutation matrix with phase rotation may enable scrambling of symbols by applying phase rotations. Using a full rank matrix may enable linear combinations of symbols to be processed on each layer, making detection even more complex for an eavesdropper who does not have information about the transformation matrix.

As shown at 310, at least one transformation matrix (M) may be used as input to operations that perform a linear transform. As shown at 312, data symbol vectors (D) (e.g., vectors for transmit symbols) may be used as additional input to the operations that perform the linear transform. As shown at 314, a linear transform may be performed by multiplying each symbol vector (D) by the transformation matrix (M). The same transformation matrix may be used for all the symbols in a slot and/or can be re-determined for each symbol, or a subset of the symbols.

In some embodiments, sets of transformation matrices can be pre-computed, stored in lookup tables, and loaded in a network node and/or a UE (e.g., by configuration, at network entry, and/or the like), or may be calculated dynamically (e.g., upon request by a network node and/or a UE). Some embodiments may include line and/or column permutations on a predefined set of transformers.

In some scenarios, pre-calculating the matrices may utilize a prohibitive amount of memory. By using a smaller set of smaller matrices, some embodiments may use a transformation matrix having a smaller dimension than M, for example M/S, where S is pre-configured and where M/S is an integer. In such instances, a set of symbols (M/S continuous symbols) may be interleaved. After such a block level interleaver, layer mapping operations can be further applied. For example, a UE may assume that complex-valued modulation symbols for each of the codewords to be transmitted are mapped onto one or more layers (e.g., according to Table 1 below).

TABLE 1

Codeword-to-layer mapping for spatial multiplexing:

| Number of layers | Number of codewords | Codeword-to-layer mapping $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 1 | $x^{(0)}(i) = d^{(0)}(2i)$ $x^{(1)}(i) = d^{(0)}(2i + 1)$ | $M_{symb}^{layer} = M_{symb}^{(0)}/2$ |
| 3 | 1 | $x^{(0)}(i) = d^{(0)}(3i)$ $x^{(1)}(i) = d^{(0)}(3i + 1)$ $x^{(2)}(i) = d^{(0)}(3i + 2)$ | $M_{symb}^{layer} = M_{symb}^{(0)}/3$ |
| 4 | 1 | $x^{(0)}(i) = d^{(0)}(4i)$ $x^{(1)}(i) = d^{(0)}(4i + 1)$ $x^{(2)}(i) = d^{(0)}(4i + 2)$ $x^{(3)}(i) = d^{(0)}(4i + 3)$ | $M_{symb}^{layer} = M_{symb}^{(0)}/4$ |
| 5 | 2 | $x^{(0)}(i) = d^{(0)}(2i)$ $x^{(1)}(i) = d^{(0)}(2i + 1)$ $x^{(2)}(i) = d^{(1)}(3i)$ $x^{(3)}(i) = d^{(1)}(3i + 1)$ $x^{(4)}(i) = d^{(1)}(3i + 2)$ | $M_{symb}^{layer} = M_{symb}^{(0)}/2 = M_{symb}^{(1)}/3$ |
| 6 | 2 | $x^{(0)}(i) = d^{(0)}(3i)$ $x^{(1)}(i) = d^{(0)}(3i + 1)$ $x^{(2)}(i) = d^{(0)}(3i + 2)$ | $M_{symb}^{layer} = M_{symb}^{(0)}/3 = M_{symb}^{(1)}/3$ |

TABLE 1-continued

Codeword-to-layer mapping for spatial multiplexing:

| Number of layers | Number of codewords | Codeword-to-layer mapping $i = 0, 1, \ldots, M_{symb}^{layer} - 1$ | |
|---|---|---|---|
| 7 | 2 | $x^{(3)}(i) = d^{(1)}(3i)$ $x^{(4)}(i) = d^{(1)}(3i + 1)$ $x^{(5)}(i) = d^{(1)}(3i + 2)$ $x^{(0)}(i) = d^{(0)}(3i)$ $x^{(1)}(i) = d^{(0)}(3i + 1)$ $x^{(2)}(i) = d^{(0)}(3i + 2)$ $x^{(3)}(i) = d^{(1)}(4i)$ $x^{(4)}(i) = d^{(1)}(4i + 1)$ $x^{(5)}(i) = d^{(1)}(4i + 2)$ $x^{(6)}(i) = d^{(1)}(4i + 3)$ | $M_{symb}^{layer} = M_{symb}^{(0)}/3 = M_{symb}^{(1)}/4$ |
| 8 | 2 | $x^{(0)}(i) = d^{(0)}(4i)$ $x^{(1)}(i) = d^{(0)}(4i + 1)$ $x^{(2)}(i) = d^{(0)}(4i + 2)$ $x^{(3)}(i) = d^{(0)}(4i + 3)$ $x^{(4)}(i) = d^{(1)}(4i)$ $x^{(5)}(i) = d^{(1)}(4i + 1)$ $x^{(6)}(i) = d^{(1)}(4i + 2)$ $x^{(7)}(i) = d^{(1)}(4i + 3)$ | $M_{symb}^{layer} = M_{symb}^{(0)}/4 = M_{symb}^{(1)}/4$ |

Complex-valued modulation symbols $d^{(q)}(0), \ldots, d^{(q)}(M_{symb}^{(q)}-1)$ for codeword q may be mapped onto the layers $x(i) = [x^{(0)}(i) \ldots x^{(v-1)}(i)]^T$, $i = 0, 1, \ldots, M_{symb}^{layer}-1$ where v is the number of layers and $M_{symb}^{layer}$ is the number of modulation symbols per layer.

When an encryption key is used to generate an additional permutation prior to the layer mapping, the complex-valued modulation symbols $d^{(q)}(0), \ldots, d^{(q)}(M_{symb}^{(q)}-1)$ for codeword q may be divided into $M_{symb}^{(q)}/S$ sub-blocks with S being the sub-block size. M/S may be equal to the number of code blocks (and/or may be indicated in downlink control information (DCI), may be derived based on total coded bits and with a known constant, may be derived from the encryption key, and/or the like). A sub-block level interleaving may be applied, where interleaver P may be derived based on the encryption key and $M_{symb}^{(q)}/S$. The output from the sub-block interleaver may be denoted as $p^{(q)}(0), \ldots, p^{(q)}(M_{symb}^{(q)}-1)$, and may be generated as follows:

$$\text{for } m = 0 \text{ to } M_{symb}^{(q)} - 1$$

$$l = \left\lfloor \frac{\frac{M_{symb}^{(q)}}{S} \times m}{M_{symb}^{(q)}} \right\rfloor;$$

$$J(m) = P(l) \times (M_{symb}^{(q)}/S) + \text{mod}(m, M_{symb}^{(q)}/S)$$

$$p^{(q)}(m) = d^{(q)}(J(m))$$

end for

Next, according to Table 1 (but replacing d with p), the complex-valued modulation symbols $I^{(q)}(0), \ldots I^{(q)}(M_{symb}^{(q)}-1)$ for codeword q may be mapped onto the layers $x(i) = [x^{(0)}(i) \ldots x^{(v-1)}(i)]^T$, $i = 0, 1, \ldots, M_{symb}^{layer}-1$, where v is the number of layers and $M_{symb}^{layer}$ is the number of modulation symbols per layer.

Upon reception of the transmit symbols by a UE, the UE may perform inverse transform processing after MIMO processing. For example, the UE may multiply soft samples of received symbols with an inverse transformation matrix. The resulting soft samples may then be processed by the upper part of a physical layer stack (e.g., a demodulation layer, a descrambling layer, etc.).

As is illustrated by this example, some embodiments described herein enhance security of communications between a UE and a network node by causing a successful attacker to have to have access to the various keys and information used (e.g., at 302 described above), a transformation order for transmit symbols (e.g., the transformation matrix (M) used and the order in which the symbols were transformed), and all of the spatial layers between the UE and the network node.

As described above, FIG. 3 is provided as an example. Embodiments are not limited to the example of FIG. 3.

Figure 4:
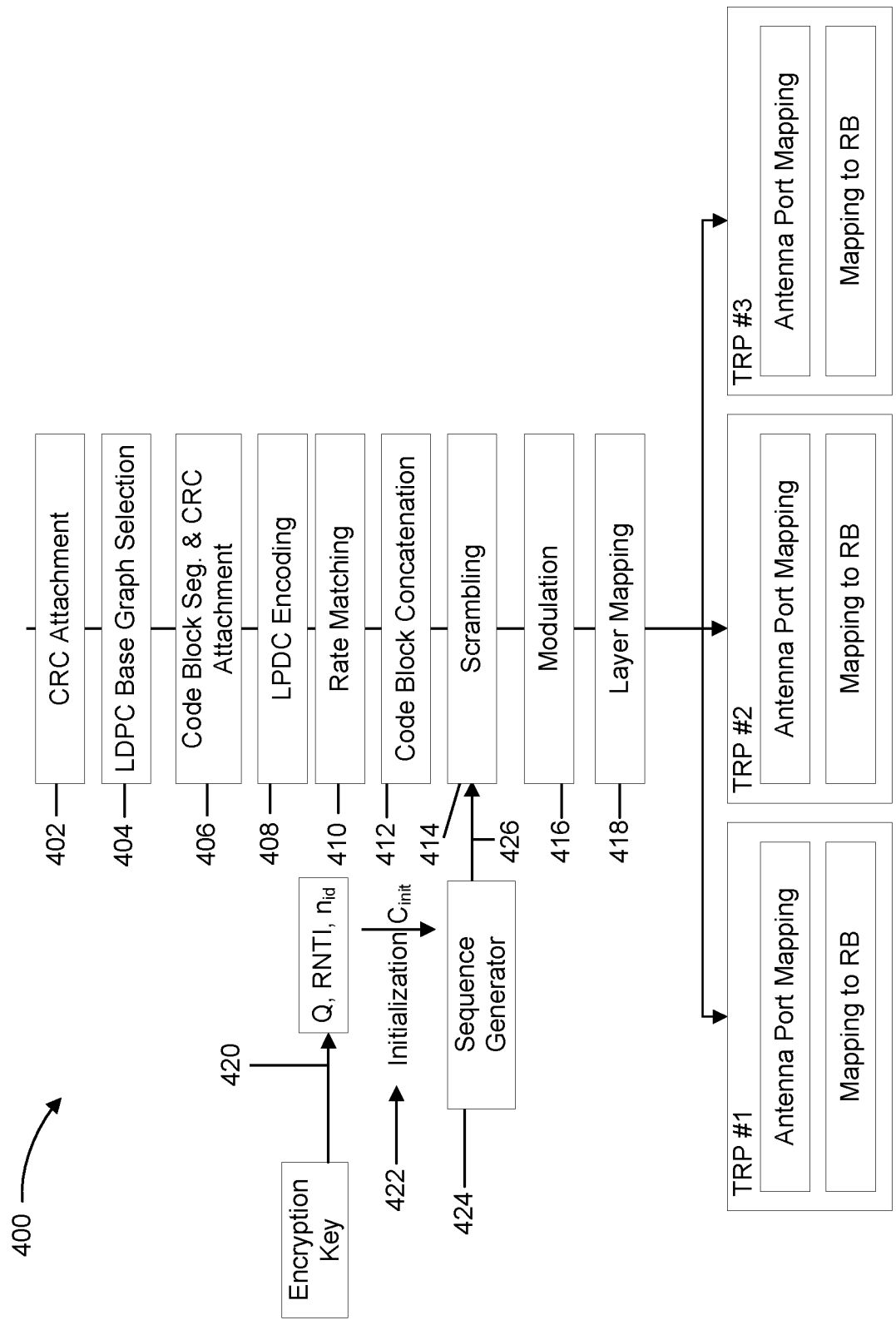
FIG. 4 illustrates an example physical layer stack, according to some embodiments described herein.

FIG. 4 illustrates an example physical layer stack according to some embodiments described herein. For example, FIG. 4 illustrates a physical layer stack 400 where a scrambling sequence is initialized by an encryption key, rather than initializing a pseudo-random layer mapping. As shown, the physical layer stack 400 may include various processing layers (or functions), such as a cyclic redundancy check (CRC) attachment layer 402, a low density parity check (LDPC) base graph selection layer 404, a code block segment ("Seg.") and CRC attachment layer 406, a LDPC encoding layer 408, a rate matching layer 410, a code block concatenation layer 412, a scrambling layer 414, a modulation layer 416, and a layer mapping layer 420. At 420, an encryption key may be combined with various other information, such as a codeword (q), an RNTI value, a data scrambling identity (e.g., the higher-layer parameter dataScramblingIdentityPDSCH) or a cell identifier (either of which are represented by $n_{ID}$), and/or the like. At 422, a $C_{init}$ value may be provided to a sequence generator 424 to initialize the generation of a sequence. In some embodiments, $C_{init}$ may be determined based on the encryption key combined with other information. At 426, the sequence generator may provide the sequence to the scrambling layer 414 and the scrambling layer 414 may scramble bits of a codeword prior to modulation.

As described above, FIG. 4 is provided as an example. Embodiments are not limited to the example of FIG. 4.

Figure 5:
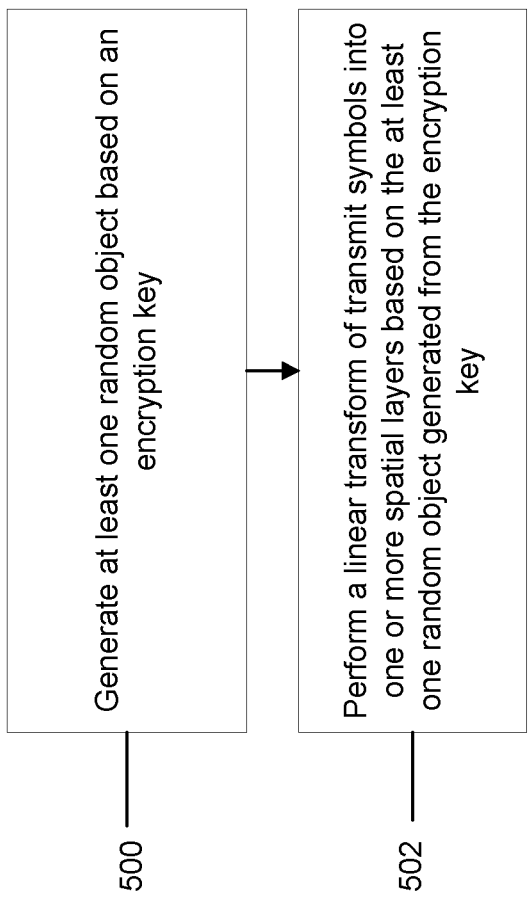
FIG. 5 illustrates an example flow diagram of a method, according to some embodiments described herein.

FIG. 5 illustrates an example flow diagram of a method, according to some embodiments described herein. For example, FIG. 5 illustrates example operations of a network node (e.g., similar to apparatus 10 in FIG. 7*a*). Some of the operations shown in FIG. 5 may be similar to some operations shown in FIGS. 1-4.

In an embodiment, the method may include, at 500, generating at least one random object based on an encryption key. For example, a network node may generate the at least one random object based on an encryption key from a processing layer of the network node. The encryption key may be used as a seed for a random object generator. In an embodiment, the method may include, at 502, performing a linear transform of transmit symbols into one or more spatial layers based on the at least one random object generated from the encryption key. For example, the network node may perform the linear transform after generating the encryption key. The linear transform may be performed between a modulation layer of a physical layer of the network node and a mapping layer of the physical layer of the network node.

In some embodiments, the encryption key may be based on one or more physical parameters. For example, a physical parameter may include a channel estimation performed by a network node and/or a UE (e.g., the result of the channel estimation may be a matrix of size (number of network antennas by number of UE antennas)). In some embodiments, only particular parts of a channel estimation may be used for generation of an encryption key. For example, because channel estimation may be noisy, the most significant bits (MSB) may be used for encryption key generation. This may ensure that the network node and the UE generate the same encryption key. In some embodiments, the at least one random object may comprise a permutation matrix or a random sequence. In some embodiments, the linear transform may be a permutation on a vector. In some embodiments, multiple non-collocated transmit receive points (TRPs) may correspond to multiple spatial layers when the one or more spatial layers include more than one spatial layer.

In some embodiments, the multiple transmit receive points (TRPs) may serve the same cell. In some embodiments, the method may further include providing modulated symbol vectors to the mapping layer of the network node. A size of the modulated symbol vectors may depend on a quantity of the one or more spatial layers and a quantity of symbols per spatial layer. In some embodiments, the one or more spatial layers may include multiple spatial layers. The multiple spatial layers may be associated with a single transmit receive point (TRP) or may be associated with multiple transmit receive points (TRPs).

In some embodiments, a quantity of the one or more spatial layers may be specific to a user equipment (UE). In some embodiments, the encryption key may be combined with other information to form the seed. In some embodiments, generating the at least one random object may comprise generating at least one separate random object for each symbol vector to be transformed. The at least one separate random object may be a pointer in a lookup table. The lookup table may include one or more transformation matrices arranged by layer numbers. In some embodiments, the method may further include multiplying each symbol vector by a transformation matrix of the one or more transformation matrices. In some embodiments, the one or more transformation matrices may have a full rank with a matching eigenvalue.

As described above, FIG. 5 is provided as an example. Embodiments are not limited to the example of FIG. 5.

Figure 6:
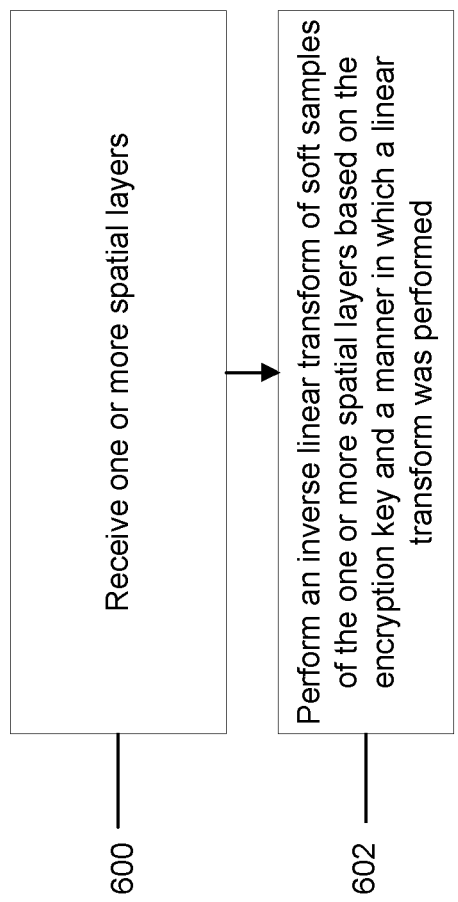
FIG. 6 illustrates an example flow diagram of a method, according to some embodiments described herein.

FIG. 6 illustrates an example flow diagram of a method, according to some embodiments described herein. For example, FIG. 6 shows example operations of a UE (e.g., similar to, or of, apparatus 20 of FIG. 7*b*). Some of the operations illustrated in FIG. 6 may be similar to some operations shown in FIGS. 1-4.

In an embodiment, the method may include, at 600, receiving one or more spatial layers. For example, a UE may receive the one or more spatial layers from a network node. Transmit symbols on the one or more spatial layers may be mapped to the one or more spatial layers based on at least one random object generated from an encryption key. In an embodiment, the method may include, at 602, performing an inverse linear transform of soft samples of the one or more spatial layers based on the encryption key and a manner in which a linear transform was performed (e.g., the manner may include a specific type of transform performed and/or transformation matrix used). The inverse linear transform may be performed between a de-mapping and a demodulation layer of a physical layer stack of the UE.

In some embodiments, the encryption key may be based on one or more physical parameters. In some embodiments, the at least one random object may comprise a permutation matrix or a random sequence. In some embodiments, the inverse linear transform may be an inverse permutation on a vector. In some embodiments, multiple non-collocated transmit receive points (TRPs) may correspond to multiple spatial layers when the one or more spatial layers include more than one spatial layer.

In some embodiments, the multiple transmit receive points (TRPs) may serve the same cell. In some embodiments, performing the inverse linear transform may comprise performing the inverse linear transform after multiple input, multiple output (MIMO) processing. In some embodiments, the one or more spatial layers may include multiple spatial layers, and the multiple spatial layers may be associated with a single transmit receive point (TRP) or may be associated with multiple transmit receive points (TRPs). In some embodiments, a quantity of the one or more spatial layers may be specific to the UE. In some embodiments, the method may further include providing the soft samples to the de-modulating layer of the physical layer stack after performing the inverse linear transform. In some embodiments, performing the inverse linear transform may comprise performing the inverse linear transform using an inverse of a transformation matrix associated with mapping the transmit symbols to the one or more spatial layers.

As described above, FIG. 6 is provided as an example. Embodiments are not limited to the example of FIG. 6.

FIG. 7a illustrates an example of an apparatus 10 according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), a TRP, and/or a WLAN access point, associated with a radio access network, such as a LTE network, 5G or NR. For example, apparatus 10 may correspond to the network node of FIGS. 1-4.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 7a. In some embodiments, where apparatus 10 represents an IAB node, it may be configured in a DU and MT architecture that divides the IAB functionality. In certain embodiments, the apparatus 10 may comprise more than one DUs.

As illustrated in the example of FIG. 7a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 7a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly.

Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

According to certain embodiments, apparatus 10 may be controlled by memory 14 and processor 12 to perform the functions associated with any of certain embodiments described herein, such as some operations of flow or signaling diagrams illustrated in FIGS. 1-9.

For instance, in one embodiment, apparatus 10 (e.g., a network node) may be controlled by memory 14 and processor 12 to generate at least one random object based on an encryption key. The encryption key may be used as a seed for a random object generator. In an embodiment, apparatus 10 (e.g., a network node) may be controlled by memory 14 and processor 12 to perform a linear transform of transmit symbols into one or more spatial layers based on the at least one random object generated from the encryption key. The linear transform may be performed between a modulation layer of a physical layer of the network node and a mapping layer of the physical layer of the network node.

FIG. 7b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 20 may be implemented in, for instance, a wireless handheld device, a wireless plug-in accessory, or the like. For example, apparatus 20 may correspond to the UE of FIGS. 1-4.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 7b.

As illustrated in the example of FIG. 7b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 7b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as those illustrated in FIGS. 1-4.

For instance, in one embodiment, apparatus 20 (e.g., a UE) may be controlled by memory 24 and processor 22 to receive one or more spatial layers. In some embodiments, transmit symbols on the one or more spatial layers may be mapped to the one or more spatial layers based on at least one random object generated from an encryption key. In an embodiment, apparatus 20 (e.g., a UE) may be controlled by memory 24 and processor 22 to perform an inverse linear transform of soft samples of the one or more spatial layers based on the encryption key and a manner in which a linear transform was performed. In some embodiments, the inverse linear transform may be performed between a de-mapping layer and a demodulation layer of a physical layer stack of the UE.

Therefore, certain example embodiments provide several technological improvements, enhancements, and/or advantages over existing technological processes. For example, one benefit of some example embodiments is improved security of communications between, for example, a UE and network node. Accordingly, the use of some example embodiments results in improved functioning of communications networks and their nodes and, therefore constitute an improvement at least to the technological field of wireless control and management, among others.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations required for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

One having ordinary skill in the art will readily understand that the example embodiments as discussed above may be practiced with steps in a different order, and/or with hardware elements in configurations which are different than those which are disclosed. Therefore, although some embodiments have been described based upon these example preferred embodiments, it would be apparent to those of skill in the art that certain modifications, variations, and alternative constructions would be apparent, while remaining within the spirit and scope of example embodiments.

As used herein, the term "BS" may refer to a gNB, a NG-NB, an eNB, a Node B, or the like. In addition, the terms "BS," "gNB," "NG-NB," "eNB," "Node B," or the like may be used interchangeably.

Embodiments described herein apply equally to both singular and plural implementations of certain embodiments, regardless of whether singular or plural language is used in connection with describing certain embodiments. For example, an embodiment that is described as including a single UE would also apply to an implementation of that embodiment that includes multiple UEs, and vice versa.

PARTIAL GLOSSARY

| | |
|---|---|
| PLS | Physical Layer Security |
| NR | New Radio Access |
| TRP | Transmit-Receive Point |
| TB | Transport Block |
| UE | User Equipment |
| HARQ | Hybrid Automatic Repeat reQuest |
| ACK | Acknowledgement |
| gNB | Next Generation Node B |
| PDSCH | Physical Downlink Shared Channel |
| PUSCH | Physical Uplink Shared Channel |
| UL | Uplink |
| NDI | New Data Indicator |
| DCI | Downlink Control Information (PDCCH) |
| CRC | Cyclic Redundancy Check |
| DL-SCH | Downlink Shared Channel |
| RNTI | Radio Network Temporary Identifier |
| TRP | Transmit and Receive Point |
| JT | Joint transmission |
| NC-JT | Non-coherent JT |

We claim:

1. A method, comprising:
generating, with a network node, at least one random object based on an encryption key, wherein the encryption key is used as a seed for a random object generator; and
performing, with the network node, a linear transform of transmit symbols into one or more spatial layers based on the at least one random object generated from the encryption key,
wherein the linear transform is performed between a modulation layer of a physical layer of the network node and a mapping layer of the physical layer of the network node.

2. An apparatus, comprising:
at least one processor; and
at least one non-transitory memory including computer program code,
wherein the at least one memory and the computer program code are configured to, with the at least one processor, cause the apparatus at least to:
generate at least one random object based on an encryption key,
wherein the encryption key is used as a seed for a random object generator; and
perform a linear transform of transmit symbols into one or more spatial layers based on the at least one random object generated from the encryption key,
wherein the linear transform is performed between a modulation layer of a physical layer of the apparatus and a mapping layer of the physical layer of the apparatus.

3. The apparatus according to claim 2, wherein the encryption key is based on one or more physical parameters.

4. The apparatus according to claim 2 wherein the at least one random object comprises a permutation matrix or a random sequence.

5. The apparatus according to claim 2, wherein the linear transform is a permutation on a vector.

6. The apparatus according to claim 2, wherein multiple non-collocated transmit receive points correspond to multiple spatial layers when the one or more spatial layers include more than one spatial layer.

7. The apparatus according to claim 6, wherein the multiple transmit receive points serve the same cell.

8. The apparatus according to claim 2, wherein the at least one memory and the computer program code are further configured to, with the at least one processor, cause the apparatus at least to:
provide modulated symbol vectors to the mapping layer of the apparatus,
wherein a size of the modulated symbol vectors depends on a quantity of the one or more spatial layers and a quantity of symbols per spatial layer.

9. The apparatus according to claim 2, wherein the one or more spatial layers includes multiple spatial layers, wherein the multiple spatial layers are associated with a single transmit receive point or are associated with multiple transmit receive points.

10. The apparatus according to claim 2, wherein a quantity of the one or more spatial layers is specific to a user equipment.

11. The apparatus according to claim 2, wherein the encryption key is combined with other information to form the seed.

12. The apparatus according to claim 2, wherein the at least one memory and the computer program code, when generating the at least one random object, are further configured to, with the at least one processor, cause the apparatus at least to:
generate at least one separate random object for each symbol vector to be transformed, wherein the at least one separate random object is a pointer in a lookup table, wherein the lookup table includes one or more transformation matrices arranged by layer numbers; and
multiply each symbol vector with a transformation matrix of the one or more transformation matrices.

13. The apparatus according to claim 12, wherein the one or more transformation matrices have a full rank with a matching eigenvalue.

14. An apparatus, comprising:
at least one processor; and
at least one non-transitory memory including computer program code,
wherein the at least one memory and the computer program code are configured to, with the at least one processor, cause the apparatus at least to:
receive one or more spatial layers, wherein transmit symbols on the one or more spatial layers are mapped to the one or more spatial layers based on at least one random object generated from an encryption key; and perform an inverse linear transform of soft samples of the one or more spatial layers based on the encryption key and a manner in which a linear transform was performed, wherein the inverse linear transform is performed between a de-mapping layer and a demodulation layer of a physical layer stack.

15. The apparatus according to claim 14, wherein the encryption key is based on one or more physical parameters.

16. The apparatus according to claim 14, wherein the at least one random object comprises a permutation matrix or a random sequence.

17. The apparatus according to claim 14, wherein the inverse linear transform is an inverse permutation on a vector.

18. The apparatus according to claim 14, wherein multiple non-collocated transmit receive points correspond to multiple spatial layers when the one or more spatial layers include more than one spatial layer.

19. The apparatus according to claim 18, wherein the multiple transmit receive points serve the same cell.

20. The apparatus according to claim 14, wherein the at least one memory and the computer program code, when performing the inverse transform, are further configured to, with the at least one processor cause the apparatus to:

perform the inverse linear transform after multiple input, multiple output processing.

* * * * *